United States Patent [19]
Faust

[11] 4,084,975
[45] Apr. 18, 1978

[54] VOLATILIZABLE FRIT COMPOSITION FORMING OXIDATION-INHIBITING VAPORS

[75] Inventor: William D. Faust, Aurora, Ohio

[73] Assignee: Ferro Corporation, Cleveland, Ohio

[21] Appl. No.: 710,732

[22] Filed: Aug. 2, 1976

Related U.S. Application Data

[63] Continuation-in-part of Ser. No. 565,452, Apr. 7, 1975, abandoned.

[51] Int. Cl.$^2$ .................................................. C03C 5/02
[52] U.S. Cl. ................................... 106/48; 106/47 R; 106/49; 106/52; 106/53; 106/54; 252/454; 252/458; 252/459; 428/432; 126/19 R
[58] Field of Search .................... 106/48, 49; 252/459, 252/458, 454; 126/19

[56] References Cited

U.S. PATENT DOCUMENTS

| | | | |
|---|---|---|---|
| 2,495,837 | 1/1950 | Porter | 106/48 |
| 2,753,271 | 7/1956 | Treptow | 106/48 |
| 3,263,675 | 8/1966 | Ria et al. | 106/48 X |
| 3,266,477 | 8/1966 | Stiles | 126/19 |
| 3,547,098 | 12/1970 | Lee | 106/48 X |
| 3,671,278 | 6/1972 | Borowski | 106/48 |
| 3,761,293 | 9/1973 | Carini et al. | 106/48 |

FOREIGN PATENT DOCUMENTS

| | | | |
|---|---|---|---|
| 2,123,235 | 11/1971 | Germany | 106/48 |
| 951,089 | 6/1964 | United Kingdom | 106/49 |
| 1,197,067 | 7/1970 | United Kingdom | 252/410 |

*Primary Examiner*—Winston A. Douglas
*Assistant Examiner*—Mark Bell
*Attorney, Agent, or Firm*—Milton L. Simmons; Wesley B. Taylor

[57] ABSTRACT

A frit composition is disclosed adapted to be applied to a metal substrate containing iron and fired to form a ceramic coat. The frit composition comprises a primary devitrifiable frit adapted to fuse at a firing temperature and upon cooling form devitrified particles; and a secondary frit containing a volatilizable metal oxide adapted to form at a firing temperature substantially an amorphous glass and precipitate crystals of the volatilizable metal oxide. The crystals at least partially volatilize at the firing temperature to provide protective vapors effective to inhibit oxidation of the substrate. Upon cooling, the amorphous glass of the secondary frit bonds the devitrified particles of the primary frit one to another. Preferably, the devitrified particles of the primary frit provide a porous ceramic coat such as on a surface of a self-cleaning cooking device exposed to cooking residues. In this case, the primary frit may also contain an oxidation catalyst.

25 Claims, No Drawings

VOLATILIZABLE FRIT COMPOSITION FORMING OXIDATION-INHIBITING VAPORS

CROSS-REFERENCE TO RELATED CASE

This is a continuation-in-part of application, Ser. No. 565,452, filed Apr. 7, 1975, now abandoned.

BACKGROUND OF THE INVENTION

The ceramic coating or enameling of a substrate, especially a metal substrate, is well known. In one practice, two ceramic coats are sequentially applied, the first being called a ground coat and the second, a cover coat. For each coat, a different frit composition is normally used. Each frit composition is milled, applied to the substrate, and after drying, each coat must in turn be fired.

In order to eliminate the ground coat application and all that it entails, a so-called direct-on, or one coat-one fire application, of an enamel or ceramic coat can be used. While excellent results are achieved by direct-on application, the problems of protecting the substrate and of securing good adherence of the ceramic coat to the substrate can be increased by this technique.

Since the substrate is usually metallic, one problem of obtaining good adherence of a ceramic coat to a substrate occurs early in the enameling process, namely, during the firing of the frit composition to cause it to fuse and form a smooth coat over the substrate. At this time, the temperatures involved may reach 1700° F or higher, and the surface of the substrate contacted by the frit can be readily and seriously oxidized. Even though a ceramic coat may ultimately form, its adherence is adversely affected by an interfacial oxide layer between it and the substrate which can cause spalling and blistering. Blistering especially appears to result from underlying rust spots.

The problem of oxidizing a substrate during firing of a frit is peculiarly accentuated if the ultimate ceramic coat is intended to be porous. For example, in the case of enameling the interior of a self-cleaning or continuous-cleaning cooking device, such as the exposed interior walls of an oven, it is desirable to have a porous or gas-permeable ceramic coat. In this instance, the ceramic coat may have an oxidation catalyst associated with it and porosity in the coat provides additional surface area for the adsorption of cooking residues or gases and for their catalytic oxidation. Normally, in firing a ceramic coat onto a substrate, a solid, continuous glassy coat forms such that the substrate is subject to oxidation hazards only at the beginning and until the solid, continuous glassy coat forms. However, in making a ceramic coat porous one also subjects the underlying substrate to oxidative attack throughout the firing and cooling cycles, since the substrate is continuously exposed through the pores of the coat.

An additional problem relating to direct-on or one coat-one fire application of a ceramic coat is that such a technique is usually limited to special and expensive grades of steel for the substrate, such as zero carbon steel which may contain up to about 0.003% carbon. If other metals containing carbon in greater amounts are used as substrates for direct-on enameling, such as cold rolled steel or other carbon-rich materials, the resulting ceramic coat usually has poor adherence and is subject to fish scaling. Bubbles, pits or specks almost inevitably develop in the surface of a single ceramic coat applied to a substrate, marring its uniformity and texture.

SUMMARY OF THE INVENTION

A principal object of the present invention is to provide means for obtaining a tightly adherent ceramic coat on a substrate while inhibiting or controlling the oxidation of the substrate during formation of the coat, including formation of a porous ceramic coat. Further objects include providing such means for use in a direct-on enameling process and for use in enameling parts of a self-cleaning cooking device that are exposed to cooking residues.

These and related objects are achieved by a combination of two frit compositions, each based on particular and differing properties. The two frit compositions are jointly applied to a substrate and fired. A primary frit, present in major amount, is devitrifiable. Upon fusing at a firing temperature and cooling, the primary frit forms devitrified particles. A secondary frit, present in minor amount, forms an amorphous glass upon firing but precipitates a volatilizable metal oxide as crystals. The balance or substantially the balance of the second frit remains in solution as the amorphous glass.

The combined frits provide a unique result. At the firing temperature, the volatilizable metal oxide at least partially volatilizes and provides protective vapors effective to inhibit oxidation of the substrate. Upon cooling, the secondary frit because of its amorphous character coats and bonds together the devitrified particles of the first frit. Each frit needs the other. Placing the volatilizable metal oxide in the primary devitrifiable frit locks the oxide in the devitrified particles where it would not nearly so readily volatilize as from the secondary amorphous glass. Also, adding a volatilizable metal oxide like antimony oxide to a devitrifiable glass makes it harder. Further, the devitrified particles of the primary frit themselves have little or no self-bonding. Alone, the devitrified particles readily abrade or fracture and therefore need the bonding action of the amorphous glass at the secondary frit composition to impart mass integrity. The volatilizable metal oxide may be selected from the oxides of antimony, tin, vanadium, molybdenum, lead, arsenic, and mixtures thereof. Antimony oxide is preferred, such as $Sb_2O_3$, $Sb_2O_4$, or $Sb_2O_5$. The use of combined primary, devitrifiable and secondary amorphous frit compositions produces a more uniform, slower and therefore longer lasting evolution of protective metal oxide vapors. The secondary frit composition may contain from about 9% to about 80% by weight of a volatilizable metal oxide, and the secondary frit composition may comprise from about 10% to about 45% by weight of the primary frit composition.

The primary frit may be designed to form a porous ceramic coat, such as in enameling parts of a cooking device exposed to cooking residues. In this case, the primary frit may also contain an oxidation catalyst which, after the ceramic coat has been formed and adhered to a substrate, may be used to oxidize cooking residues which penetrate the porous ceramic coat in order to make the cooking device self-cleaning. In this instance, the secondary frit composition does not enter into the catalytic cleaning process.

Ceramic coats including porous coats deposited in accordance with the present invention are strongly adherent to substrates and much less susceptible to spalling and blistering. Further, carbon-rich metals like cold rolled steel may be used as the substrate.

DESCRIPTION OF THE PREFERRED EMBODIMENTS

The primary frit may be any known frit composition and, where a porous ceramic coat is desired as for coating a surface of a cooking device, the primary frit is one adapted to be porous after firing and cooling. Such frit compositions are known in the art and form discrete, devitrified particles. Specific examples of such compositions are hereinafter given. It is of little avail to incorporate a volatilizable metal oxide in such a frit, since the oxide becomes so locked into the devitrified structure that it it not nearly as susceptible to volatilization as when incorporated into the amorphous secondary frit.

The secondary frit may be any known firt composition which is amorphous at the firing temperature and maintains its amorphous character upon cooling. The volatilizable metal oxide or metal compound adapted to be converted to the oxide at a firing temperature is incorporated into the secondary frit at any time during its preparation, that is, prior to, during, or after smelting batch components to prepare the frit composition. The metal of the metal oxide or compound is selected from the group consisting of antimony, tin, vanadium, molybdenum, lead, arsenic, and mixtures thereof.

Particles of the two frit compositions are mixed in any convenient manner, such as during milling, and the combined frits are applied in a conventional manner, such as from an aqueous slip, onto a substrate, usually one containing iron. When the frit compositions are heated to a temperature sufficient to fuse them, the volatilizable metal compound has either been previously converted to the oxide form, as by the heat of smelting, or is now for the first time converted to the oxide form, depending on when the metal compound was first incorporated in the secondary frit. During the heating and firing of the frit combination, the secondary frit becomes an amorphous glass and the volatilizable metal oxide precipitates from it as crystals. Such crystals at least partially volatilize and form protective vapors in the atmosphere around the substrate and particularly at the interface between the substrate and the ceramic coat being formed. This inhibits oxidation of the substrate.

Upon cooling, the devitrifiable primary frit forms devitrified particles having by themselves little self-bonding action excepting that which may have been acquired by sintering. Even so, an agglomerate of such particles abrades or fractures easily. The secondary frit, retaining its amorphous character, coats and bonds the devitrified particles of the primary frit one to another, such that the ceramic coat which is ultimately formed is porous. For this purpose, the secondary frit is preferably relatively highly fluxed. Desirably, the secondary frit contains at least about 14% by weight of fluxing agents and preferably from about 30% to about 50% although greater amounts of fluxing agents can be used. Fluxing agents include $B_2O_3$, $Na_2O$, $K_2O$, CaO, BaO, ZnO, and the like.

The presence of any volatilizable metal oxide affords some advantage. An amount of volatilizable metal oxide needed to inhibit oxidation of a substrate under certain given conditions is easily determined by trial and error. In general, an amount of the oxide from about 15% to about 45% by weight of the secondary frit suffices for most applications.

While it is the volatilizable metal oxide crystal which is volatilized and forms the protective vapors, the metal can be initially used in the form of many different compounds as long as they are adapted to be converted to the oxide form at least at the temperature of firing the frit composition into which the metal compound is incorporated. For example, the halogens, carbonates, nitrates, carboxylates such as the acetates and oxalates, hydroxides, and the like of the indicated metals can be used as the metal compound, including the oxides of those metals. Specific examples which are intended only to be illustrative include: antimony trifluoride, lead acetate, lead metaborate, lead borofluoride, lead butyrate, lead carbonate, lead chlorides, lead nitrate, lead oxalate, lead phosphite, molybdenum boride, molybdenum fluorides, molybdenum hydroxide, molybdenum oxytetrafluoride, molybdenum phosphide, tin acetate, tin fluorides, tin nitrates, vanadium boride, vanadium chloride, vanadium fluorides, vanadium oxidichloride, vanadium oxidifluoride, and the like. Some compounds may contain two or more of the metals useful in the present invention, such as: lead pyroarsenate, lead molybdate, lead metavanadate, and the like. However, the oxides are generally much more stable materials and normally avoid any possible toxic or explosive effect and therefore are convenient and preferable to use. As used here and in the claims, the term "metal compound" includes the metal oxides.

Combining the secondary frit with a primary frit, as described, has been found to provide a more balanced, controlled release of the volatilizable metal oxide at the time of firing. The protection afforded by the volatilizable oxide is accordingly effective for a longer period of time. Although the secondary frit is glass and amorphous in character, ionic-covalent bonds exist among its components. This is believed to oppose a quick loss of a volatilizable metal oxide as compared to a frit composition in which the volatilizable metal oxide is individually present in a mechanical mixture with frit particles.

A secondary frit as above defined may have the following composition per 100 parts by weight:

| Component | Parts by Weight |
| --- | --- |
| Volatilizable Metal Oxide | 9 to 80 |
| $SiO_2$ | 0 to 35 |
| $B_2O_3$ | 0 to 40 |
| $Na_2O$ | 0 to 40 |
| $K_2O$ | 0 to 25 |
| CaO | 0 to 30 |
| $Al_2O_3$ | 0 to 30 |
| BaO | 0 to 40 |
| ZnO | 0 to 25 |
| $F_2$ | 0 to 10 |

The volatilizable metal oxide may be an oxide of any of the metals previously disclosed. The fluorine may be present as the fluoride of at least one of the metals indicated. If desired, a nitrogen-containing component may be used in an amount to produce up to two parts by weight of $NO_2$ upon smelting. This gas leaves as an effluent during the smelting operation but mixes the batch in doing so.

The secondary frit in any amount affords some advantage when mixed with the primary frit. However, for most applications, the secondary frit comprises from about 10% to about 45% by weight of the primary frit. Preferably the primary and secondary frits are intermixed after the smelting and firing operations and when the frit compositions are jointly milled to desired particle size. When a mixture of primary and secondary frit compositions is heated in a firing range, for example within the range of about 1300° F to about 1700° F when oxidation occurs much more rapidly than at room temperatures, vapors from the volatilizable metal oxide displace the ambient atmosphere and substitute a protective environment, especially around any substrate that may be present.

The present invention is especially useful with ceramic coats that are porous and especially those formed from a devitrifiable frit. When a solid, non-porous ceramic coat is deposited, a continuous glassy layer forms over a substrate and tends to seal it from excessive oxidation from the ambient atmosphere. However, when a porous coat is formed, this protection is not realized. At least portions of the substrate are continuously accessible to the atmosphere through pores of the coat and therefore much more susceptible to oxidation, especially at the relatively high temperatures of firing.

Porous ceramic coats are used in self-cleaning cooking devices, that is, a cooking device which is made self-cleaning by providing a catalytic oxidizing surface which is exposed to products resulting from cooking food. In use, cooking devices are often splattered by grease or receive drippings of grease or other food particles. Afterwards by heating the device, many food residues can be oxidized and removed. When a cooking device is self-cleaning, temperatures required for removing accumulated cooking residues can be substantially lowered by providing a catalytic coating which oxidizes the food residues. In this manner, cooking devices can be cleaned without overheating a kitchen or other work area and without other problems attendant the use of high temperatures.

One technique used in providing an oxidation catalyst is to associate it with a ceramic coat which is used to cover a wall or other part of the cooking device that is exposed to cooking residues. Although cooking devices such as ovens and grills used industrially or for household purposes are normally treated in this manner, still other cooking devices such as rotisseries, chaffing dishes, broilers, and the like can be similarly treated to be self-cleaning.

The oxidation catalyst may be a part of the ceramic coat itself or supported by the coat in any convenient manner. For example, the oxidation catalyst can form a layer over a ceramic coat which may be non-porous, or the oxidation catalyst can be directly incorporated into the composition of the ceramic or enamel coat and in this case the coat should be porous.

The technique of preparing porous ceramic coats is known in the art. In general, the glass composition is overloaded with metal oxides which precipitate from solution upon cooling a smelted glass, instead of being absorbed into the glass matrix, and form recrystallized fragments. On firing the resultant glass below its liquidation temperature, the recrystallized fragments sinter together, forming the desired porosity.

The following patents disclose ceramic coats for self-cleaning cooking devices which may be either non-porous or porous and in either case carry an oxidation catalyst.

U.S. Pat. No. 3,266,477 to Stiles discloses a technique of covering a ceramic coat with an oxidation catalyst as shown, for example, in FIG. 4 of that patent. In this instance, a metal surface is coated with a ceramic and the ceramic is coated with a particulate catalyst which itself can optionally be carried on a support. The catalyst is partially embedded in the ceramic coat as by heating the ceramic to its softening point with the catalyst in contact therewith. The frit and temperature of heating should be so related that the catalyst becomes partially embedded. Examples of the oxidation catalyst that may be used in this manner include without limitation ruthenium, palladium, platinum, and the oxides, cerates, manganates, manganites, chromites, chromates, and vanadates of cobalt, nickel, cerium, ruthenium, platinum and palladium. These catalysts are preferred because of their comparatively high activity at relatively low temperatures. The various described catalysts can be supported, if desired, upon particulate carriers in accordance with conventional practices. Such carriers include, for example, finely divided alumina, ceria, silica-alumina, magnesia, calcium oxide, silica, etc.

U.S. Pat. No. 3,460,523 to Stiles et al also discloses a composition which is useful for coating the walls of an oven and comprises a porous film containing catalytic materials. This composition contains finely divided thermally stable oxidation catalyst particles bonded together by a water soluble alkaline silicate and can be applied over a porous ceramic coat as herein disclosed. According to this patent, the coated surface has a porosity greater than 15% by volume and contains as an essential ingredient at least 10% by weight of a thermally stable oxidation catalyst which, for example, can include without limitation the oxygen containing compounds of zirconium, titanium, vanadium, chromium, manganese, cobalt, iron, nickel, tungsten, molybdenum, copper, zinc, the rare earths, palladium, rhodium, ruthenium, osmium, iridium, platinum, and mixtures thereof.

However, it is preferred to include the oxidation catalyst directly into the frit which forms the ceramic coat to avoid, as one advantage, loss of the oxidation catalyst by abrasion. This concept is illustrated, for instance, in U.S. Pat. No. 3,547,098 to Lee, U.S. Pat. No. 3,671,278 to Borowski, and in U.S. Pat. No. 3,718,494 to Denny et al. The Lee patent teaches incorporating oxidation-inducing metal oxides in frit by smelting the oxides homogeneously into and throughout the fritted glass matrix which is later milled and applied as a porcelain enamel to an oven liner. The ceramic coat may contain from about 10% to about 70% by weight of at least one oxidation-inducing oxide selected from the group consisting of cobalt, manganese, copper, and chromium. The frit is conventionally milled into a porcelain enamel slip for application to and firing on a substrate forming a cooking oven liner.

The Borowski patent discloses a porcelain enamel adapted to oxidize oven soils that is prepared from frit containing from about 15% to about 70% by weight of iron oxide. The iron oxide is homogeneously smelted into the frit and serves as an oxidation catalyst.

The Denny et al patent discloses metal oxides which when mixed with glass frit applied to the walls of an oven form a porous layer. The layer is described as comprising mutually sintered vitreous enamel particles and finely divided transition metal oxides including copper oxide with the oxides of cobalt or manganese or both.

The disclosures of the patents specifically mentioned are hereby incorporated by reference.

To provide a ceramic coat in accordance with the present invention for a self-cleaning cooking device, a solid ceramic coat may be formed as previously described and then convered with an oxidation catalyst as disclosed by U.S. Pat. No. 3,266,477 to Stiles. Or a porous ceramic coat can be formed using a frit composition as previously described with the addition of an oxidation catalyst in the manner disclosed by other previously noted patents.

The following examples only illustrate the invention and should not be construed as imposing limitations on the claims.

EXAMPLES 1 THROUGH 9

The following examples illustrate batch formulations which may be used to form fritted glasses having oxide analyses by weight as indicated and which may be used as secondary frit compositions as herein defined. Frit was prepared by these formulations in a standard manner, that is, by smelting the indicated batch formulation within a range of about 2000° F to about 2600° F and then fritting the glass as by passing the cooling glass between fritting rollers or by quenching it in cold water.

EXAMPLE 1

| Batch - Grams | | Oxide Analysis - % | |
|---|---|---|---|
| Boric Acid | 534 | $B_2O_3$ | 12.87 |
| Soda Ash | 434 | $Na_2O$ | 11.32 |
| Potassium Carbonate | 90 | $K_2O$ | 2.61 |
| Sodium Nitrate | 32 | CaO | 6.30 |
| Fluorspar | 174 | $(Al_2O_3)$ | 4.25 |
| Potter's Whiting | 46 | BaO | 5.29 |
| Calcined Alumina | 100 | $Sb_2O_5$ | 46.81 |
| Barium Carbonate | 160 | ZnO | 10.55 |
| Antimony Oxide | 983 | Subtotal | 100.00 |
| Zinc Oxide | 247 | $F_2$ | 3.49% |
| Batch Weight | 2800 | | |
| Melted Weight | 2384 | | |

EXAMPLE 2

| Batch - Grams | | Oxide Analysis - % | |
|---|---|---|---|
| Soda Ash | 368 | $SiO_2$ | 16.09 |
| Potassium Carbonate | 8 | $Na_2O$ | 10.91 |
| Sodium Nitrate | 34 | $K_2O$ | 2.51 |
| Feldspar | 540 | CaO | 6.09 |
| Fluorspar | 225 | $Al_2O_3$ | 4.07 |
| Calcined Alumina | 11 | BaO | 5.09 |
| Sodium Silicofluoride | 129 | $Sb_2O_5$ | 45.06 |
| Barium Carbonate | 171 | ZnO | 10.17 |
| Antimony Oxide | 1050 | Subtotal | 99.99 |
| Zinc Oxide | 264 | $F_2$ | 7.09% |
| Batch Weight | 2800 | | |
| Melted Weight | 2695 | | |

EXAMPLE 3

| Batch - Grams | | Oxide Analysis - % | |
|---|---|---|---|
| Borax | 467 | $SiO_2$ | 14.85 |
| Soda Ash | 129 | $B_2O_3$ | 11.45 |
| Potassium Carbonate | 91 | $Na_2O$ | 10.07 |
| Sodium Nitrate | 32 | $K_2O$ | 2.32 |
| Fluorspar | 213 | CaO | 5.63 |
| Sodium Silicofluoride | 122 | BaO | 4.68 |
| Powdered Quartz | 342 | $Sb_2O_5$ | 41.63 |
| Barium Carbonate | 161 | ZnO | 9.36 |
| Antimony Oxide | 994 | Subtotal | 99.99 |
| Zinc Oxide | 249 | $F_2$ | 6.55% |
| Batch Weight | 2800 | | |
| Melted Weight | 2765 | | |

EXAMPLE 4

| Batch - Grams | | Oxide Analysis - % | |
|---|---|---|---|
| Borax | 484 | $SiO_2$ | 15.00 |
| Soda Ash | 111 | $B_2O_3$ | 11.56 |
| Potassium Carbonate | 12 | $Na_2O$ | 10.14 |
| Sodium Nitrate | 33 | $K_2O$ | 2.35 |
| Feldspar | 509 | CaO | 5.66 |
| Fluorspar | 220 | $Al_2O_3$ | 3.82 |
| Calcined Alumina | 15 | $Sb_2O_5$ | 42.00 |
| Sodium Silicofluoride | 126 | ZnO | 9.48 |
| Antimony Oxide | 1030 | | |
| Zinc Oxide | 259 | Subtotal | 100.01 |
| Batch Weight | 2799 | | |

EXAMPLE 4-continued

| Batch - Grams | | Oxide Analysis - % | |
|---|---|---|---|
| Melted Weight | 2838 | $F_2$ | 6.58% |

EXAMPLE 5

| Batch - Grams | |
|---|---|
| Borax | 643 |
| Soda Ash | 148 |
| Potassium Carbonate | 16 |
| Sodium Nitrate | 44 |
| Feldspar | 675 |
| Fluorspar | 292 |
| Calcined Alumina | 20 |
| Sodium Silicofluoride | 167 |
| Barium Carbonate | 223 |
| Antimony Oxide | 234 |
| Zinc Oxide | 343 |
| Batch Weight | 2805 |

EXAMPLE 6

| Batch - Grams | | Oxide Analysis - % | |
|---|---|---|---|
| Boric Acid | 545 | $SiO_2$ | 15.87 |
| Potassium Carbonate | 92 | $B_2O_3$ | 12.22 |
| Fluorspar | 178 | $K_2O$ | 2.48 |
| Potter's Whiting | 47 | CaO | 6.00 |
| Calcined Alumina | 102 | $Al_2O_3$ | 4.03 |
| Powdered Quartz | 399 | BaO | 5.01 |
| Barium Carbonate | 163 | $Sb_2O_5$ | 44.38 |
| Antimony Oxide | 1002 | ZnO | 10.02 |
| Zinc Oxide | 252 | Subtotal | 100.01 |
| Batch Weight | 2780 | $F_2$ | 3.32% |
| Melted Weight | 2561 | | |

EXAMPLE 7

| Batch - Grams | | Oxide Analysis - % | |
|---|---|---|---|
| Borax | 465 | $SiO_2$ | 14.66 |
| Soda Ash | 128 | $B_2O_3$ | 11.28 |
| Sodium Nitrate | 32 | $Na_2O$ | 9.92 |
| Fluorspar | 212 | CaO | 5.54 |
| Calcined Alumina | 101 | $Al_2O_3$ | 3.73 |
| Sodium Silicofluoride | 122 | BaO | 4.63 |
| Powdered Quartz | 341 | $Sb_2O_5$ | 41.02 |
| Barium Carbonate | 161 | ZnO | 9.22 |
| Antimony Oxide | 990 | Subtotal | 100.00 |
| Zinc Oxide | 248 | | |
| Batch Weight | 2800 | $F_2$ | 6.46% |
| Melted Weight | 2795 | | |

EXAMPLE 8

| Batch - Grams | | Oxide Analysis - % | |
|---|---|---|---|
| Borax | 489 | $SiO_2$ | 15.13 |
| Soda Ash | 18 | $B_2O_3$ | 11.67 |
| Potassium Carbonate | 25 | $Na_2O$ | 10.26 |
| Sodium Nitrate | 34 | $K_2O$ | 2.38 |
| Feldspar | 435 | $Al_2O_3$ | 3.85 |
| Calcined Alumina | 29 | BaO | 4.78 |
| Sodium Silicofluoride | 300 | $Sb_2O_5$ | 42.39 |
| Barium Carbonate | 169 | ZnO | 9.55 |
| Antimony Oxide | 1040 | Subtotal | 100.01 |
| Zinc Oxide | 261 | $F_2$ | 6.66% |
| Batch Weight | 2800 | | |
| Melted Weight | 2838 | | |

EXAMPLE 9

| Batch - Grams | | Oxide Analysis - % | |
|---|---|---|---|
| Borax | 501 | $SiO_2$ | 15.74 |
| Soda Ash | 115 | $B_2O_3$ | 12.14 |
| Potassium Carbonate | 12 | $Na_2O$ | 10.66 |
| Sodium Nitrate | 34 | $K_2O$ | 2.46 |
| Feldspar | 526 | CaO | 5.95 |
| Fluorspar | 228 | $Al_2O_3$ | 3.99 |
| Calcined Alumina | 15 | BaO | 4.97 |
| Sodium Silicofluoride | 131 | $Sb_2O_5$ | 44.09 |
| Barium Carbonate | 173 | Subtotal | 100.00 |
| Antimony Oxide | 1065 | $F_2$ | 6.93% |
| Batch Weight | 2800 | | |

EXAMPLE 9-continued

| Batch - Grams | | Oxide Analysis - % |
|---|---|---|
| Melted Weight | 2800 | |

The amount of fluorine in the frit compositions of Examples 1 through 9 is given in weight percent. The fluorine is present as the fluoride of at least one of the metals indicated.

EXAMPLES 10 THROUGH 13

These examples show additional batch formulations and oxide analyses by weight percent of frit compositions obtained by smelting the formulations which can be used as secondary frit compositions as herein defined. These frits contain differing amounts of the volatilizable metal oxide, namely, about 80%, 70%, 60%, and 50%, respectively, of an oxide of antimony.

| EXAMPLE | 10 | 11 | 12 | 13 |
|---|---|---|---|---|
| Batch - Grams | | | | |
| Borax | 168 | 286 | 311 | 399 |
| Soda Ash | 67 | 77 | 133 | 162 |
| Potassium Carbonate | 1 | 2 | — | 2 |
| Feldspar | 196 | 276 | 371 | 459 |
| Potter's Whiting | 97 | 136 | 185 | 230 |
| Calcined Alumina | 1 | 3 | 3 | 4 |
| Barium Carbonate | 58 | 85 | 109 | 138 |
| Antimony Oxide | 2123 | 1805 | 1519 | 1193 |
| Zinc Oxide | 89 | 129 | 169 | 213 |
| Batch Weight | 2800 | 2799 | 2800 | 2800 |
| Melted Weight | 2949 | 2886 | 2806 | 2731 |
| Oxide Analysis - % | | | | |
| $SiO_2$ | 4.80 | 6.96 | 9.55 | 12.17 |
| $B_2O_3$ | 3.71 | 6.46 | 7.23 | 9.54 |
| $Na_2O$ | 3.20 | 4.77 | 6.43 | 8.28 |
| $K_2O$ | 0.76 | 1.10 | 1.46 | 1.91 |
| CaO | 1.80 | 2.58 | 3.61 | 4.62 |
| $Al_2O_3$ | 1.20 | 1.78 | 2.43 | 3.10 |
| BaO | 1.52 | 2.27 | 3.00 | 3.91 |
| $Sb_2O_5$ | 80.02 | 69.61 | 60.28 | 48.69 |
| ZnO | 3.01 | 4.46 | 6.02 | 7.80 |
| Subtotal | 100.02 | 99.99 | 100.01 | 100.02 |

When the melted weight of a batch formulation is greater than the weight of the batch itself, this is due to a greater addition of atmospheric oxygen than loss of weight due to effluents.

EXAMPLES 14 THROUGH 18

While the foregoing examples use an oxide of antimony as the volatilizable metal oxide, the present examples illustrate the use of each of the other previously identified volatilizable metal oxides that are useful in the present invention. Frit was prepared from these batch formulations in the same manner as described for Examples 1 through 9.

| EXAMPLE | 14 | 15 | 16 | 17 | 18 |
|---|---|---|---|---|---|
| Batch - Grams | | | | | |
| Borax | 457 | 457 | 457 | 457 | 457 |
| Soda Ash | 105 | 105 | 105 | 105 | 105 |
| Potassium Carbonate | 11 | 11 | 11 | 11 | 11 |
| Sodium Nitrate | 31 | 31 | 31 | 31 | 31 |
| Feldspar | 480 | 480 | 480 | 480 | 480 |
| Fluorspar | 208 | 208 | 208 | 208 | 208 |
| Calcined Alumina | 14 | 14 | 14 | 14 | 14 |
| Sodium Silicofluoride | 120 | 120 | 120 | 120 | 120 |
| Barium Carbonate | 158 | 158 | 158 | 158 | 158 |
| Zinc Oxide | 244 | 244 | 244 | 244 | 244 |
| Arsenic Trioxide | 280 | — | — | — | — |
| Molybdenum Trioxide | — | 972 | — | — | — |
| Tin Oxide | — | — | 972 | — | — |
| Lead Oxide | — | — | — | 972 | — |
| Vanadium Pentoxide | — | — | — | — | 972 |
| Batch Weight | 2108 | 2800 | 2800 | 2800 | 2800 |

EXAMPLE 19

This example illustrates a batch formulation which may be used in preparing a primary frit as herein defined as well as its use in conjunction with a secondary frit. The primary frit is characterized by forming a porous ceramic coat and contains an oxidation catalyst to render the coat useful in coating parts of a cooking device exposed to cooking residues and thereby render those parts self-cleaning.

The following composition was weighed and mixed in a suitable raw batch mixer or blender.

| | Parts by Weight |
|---|---|
| Boric Acid | 132 |
| Potassium Carbonate | 149 |
| Sodium Nitrate | 72 |
| Feldspar | 328 |
| Potter's Whiting | 21 |
| Sodium Tripolyphosphate | 25 |
| Red Iron Oxide | 798 |
| Milled Zircon | 93 |
| Spodumene | 283 |
| Powdered Quartz | 400 |
| Cobalt Oxide | 93.3 |
| Copper Oxide | 46.8 |
| Rutile | 359 |

This mixture was smelted at 2550° F, quenched (fritted) in cold water, and dried at 200° F, the resultant frit having the following oxide composition in weight percent:

| | Percent |
|---|---|
| $B_2O_3$ | 2.86 |
| CaO | 0.43 |
| $Co_2O_3$ | 3.57 |
| CuO | 1.79 |
| $K_2O$ | 5.22 |
| $Li_2O$ | 0.77 |
| $Na_2O$ | 1.72 |
| $P_2O_5$ | 0.56 |
| $SiO_2$ | 32.15 |
| $TiO_2$ | 13.21 |
| $ZrO_2$ | 2.30 |
| $Fe_2O_3$ | 35.35 |
| TOTAL | 99.93 |

In this primary frit, the iron oxide serves as the oxidation catalyst as described in U.S. Pat. No. 3,671,278 to Borowski. The resulting frit was milled in a conventional ball mill using the following mill additions based on 100 parts by weight of the primary frit.

| Frit (Primary) | 100.00 |
|---|---|
| Frit (Secondary) | 20.00 |
| Clay | 1.5 |
| Alumina Hydrate | 0.093 |
| $NaNO_2$ | 0.063 |
| Gum Tragacanth | 0.063 |
| Bentonite | 0.63 |
| Magnesium Carbonate | 0.125 |
| Water | 50.00 |

Any of the frit compositions of Examples 1 through 18 may be used as the secondary frit composition.

A 50 cubic centimeter sample of the mill product contained 2 to 3 grams of frit having a particle size passing 200 mesh U.S. Standard Sieve. A conventional aqueous slip of the mill product was cast onto a sheet of cold rolled steel. After drying, the sheet was fired using a direct-on process at a temperature of about 1350° F to about 1550° F for about two minutes to about five minutes. During this time the frit fused and upon cooling formed a smooth but porous ceramic coat. The volatilizable metal oxide slowly volatilized over a wide temperature range during the firing and inhibited the oxidation of the cold rolled steel. Subsequently, it was noted that there was excellent adhesion of the ceramic coat to the steel sheet and no blisters or spotty bonding. There was also no loss of the self-cleaning ability of the ceramic coat.

EXAMPLE 20

The following composition was weighed and mixed in a blender.

|  | Parts by Weight |
|---|---|
| Borax | 56 |
| Soda Ash | 158 |
| Sodium Nitrate | 34 |
| Calcined Alumina | 182 |
| Powdered Quartz | 418 |
| Red Iron Oxide | 1664.5 |
| Rutile | 287 |

This mixture was then smelted at 2550° F, quenched (fritted) in cold water, and dried at 200° F, the resulting frit having the following oxide composition in weight percent:

|  | Percent |
|---|---|
| $SiO_2$ | 15.52 |
| $B_2O_3$ | 1.35 |
| $Na_2O$ | 4.49 |
| $Al_2O_3$ | 6.68 |
| $Fe_2O_3$ | 61.74 |
| $TiO_2$ | 10.22 |

This frit was used as a primary frit composition and was milled in a conventional ball mill using the following mill additions based on 100 parts by weight of the primary frit.

| Frit (Primary) | 100.00 |
|---|---|
| Clay | 1.50 |
| Bentonite | 0.63 |
| Gum Tragacanth | 1/16 |
| $NaNO_2$ | 1/16 |
| Alumina Hydrate | 3/32 |
| Magnesium Carbonate | 1/8 |
| Iron Oxide | 6.3 |
| Copper Oxide | 1.3 |
| Antimony Bearing Frit (Secondary) | 14 to 30 |
| Water | 50 |

Any of the antimony frit compositions of Examples 1 through 13 may be used as the secondary frit. A 50 cubic centimeter sample of mill product contained 2 to 3 grams of the frit having a particle size passing 200 mesh U.S. Standard Sieve. An aqueous slip of the mill product was applied on a sheet of enameling iron and fired as in Example 19. A porous ceramic coat was formed in which the iron oxide served as an oxidation catalyst. The ceramic coat had excellent adherence to the sheet of enameling iron.

EXAMPLE 21

As a related benefit of inhibiting oxidation of the substrate as herein described, a ceramic coat produced in accordance with the present invention has improved adherence to a metallic substrate. This can be illustrated by a secondary frit containing a volatilizable metal oxide, like antimony oxide, as part of the frit composition in contrast to a frit with which the volatilizable metal oxide is present as a raw, individual ingredient in a simple mechanical mixture.

Two Compositions, designated A and B, were prepared, each consisting of primary and secondary frits as herein defined. The primary frit of each Composition A and B contained no volatilizable oxide and was of the same composition. The secondary frits for Compositions A and B were likewise the same, except that the secondary frit for Composition A was adjusted to contain 40% by weight antimony oxide, resulting in an actual level of 8% antimony oxide in the milled product; while the secondary frit for Composition B contain no antimony oxide or other volatilizable metal oxide. Instead, in Composition B, 8% of antimony oxide, based on the primary frit, was added as a separate ingredient in simple mechanical mixture with the primary and secondary frits of that composition. The Compositions A and B contained the following ingredients:

|  | Compositions | |
|---|---|---|
| Mill Additions | A | B |
| Primary Frit | 100% | 100% |
| Secondary Frit (Antimony Oxide Bearing Frit) | 20 | — |
| Secondary Frit (No Volatile Constituents Present) | — | 20 |
| Raw Antimony Oxide | — | 8 |
| Clay | 1.5 | 1.5 |
| Hydrated Alumina | 0.093 | 0.093 |
| $NaNO_2$ | 0.063 | 0.063 |
| Gum Tragacanth | 0.063 | 0.063 |
| Bentonite | 0.630 | 0.630 |
| Magnesium Carbonate | 0.125 | 0.125 |
| Water | 45 | 45 |

Compositions A and B were tested by applying the frit compositions to a cold-rolled steel plate at an application rate of 75 grams per square foot. This was followed by heating the coated steel plate to the indicated firing temperatures for the stated times. The adherence of the resulted ceramic coat to a steel plate was then observed. In grading the effectiveness of the adherence, the following letters and meanings were used:

G = Good
F = Fair
P = Poor
N = No Adherence

Where a couplet of letters is used, an intermediate grade was intended. For example, "N-P" means no adherence to poor adherence.

The following test results show that Composition A in which the secondary frit contained antimony oxide as an integral part of that frit had superior results to Composition B in which the antimony oxide was present as a raw ingredient in a simple mechanical mixture.

|  | Compositions | |
|---|---|---|
| Temperature (3 Minute Fire) | A | B |
| 1630° | — | N-P |
| 1600° | — | N-P* |
| 1570° | — | N-P |
| 1540° | G | P |
| 1510° | G | F |
| 1480° | G* | F-G |
| 1450° | G | G |

-continued

|  | Compositions | |
|---|---|---|
|  | A | B |
| 1420° | G | G |
| 1390° | G | G |
| 1360° | G | G |
| Time at 1480° F in Minutes | | |
| 2 | G | G |
| 3 | G* | F-G |
| 4 | G | F |
| 5 | G | P |
| 6 | G | P-F |
| 7 | G- | P-F |
| 8 | G-F | P-F |

*Optimum fire based on aluminum stick scratch.

For three minute firings at varying temperatures, Composition B had good adherence up through 1450° F, but above that, for example, at temperatures 1480° F to 1540° F Composition B had poor or fair adherence. In contrast, Composition A had good adherence at all temperatures which ranged from 1360° F to 1540° F. The advantages of the invention were especially apparent at firings at temperatures at least as high as 1480° F for at least three minutes of firings.

Although the foregoing describes several embodiments of the present invention, it is understood that the invention may be practiced in still other forms within the scope of the following claims.

I claim:

1. A frit composition adapted to be applied to a metal substrate containing iron and fired to form a ceramic coat, said frit composition comprising (a) in major amount a primary devitrifiable frit composition adapted to fuse at a firing temperature and upon cooling form devitrified particles, and (b) in minor amount a secondary frit composition containing a volatilizable metal oxide adapted to form at a firing temperature a substantially amorphous glass and precipitate crystals of said volatilizable metal oxide partially to volatilize said precipitated crystals at said firing temperature, thereby to provide protective vapors effective to inhibit oxidation of said substrate, and upon cooling to form an amorphous bond adhering said devitrified particles of the primary frit composition one to another, said volatilizable metal oxide being selected from the oxides of antimony, tin, vanadium, molybdenum, lead, arsenic, and mixtures thereof, the combination of said devitrifiable primary and amorphous secondary frit compositions providing a balanced, controlled release of the metallizable metal oxide at the time of firing to extend the protection afforded by the volatilizable metal oxide over a period of time.

2. The frit composition of claim 1 in which said secondary frit composition contains about 14% to about 50% by weight of fluxing agents.

3. The frit composition of claim 1 in which said secondary frit composition contains from about 30% to about 50% by weight of fluxing agents.

4. The frit composition of claim 1 in which said secondary frit composition contains from about 9% to about 80% by weight of said volatilizable metal oxide.

5. The frit composition of claim 1 in which secondary frit composition comprises from about 10% to about 45% by weight of said primary frit composition.

6. The frit composition of claim 1 in which said firing temperature is within the range of about 1300° F to about 1700° F.

7. The frit composition of claim 1 in which said secondary frit composition consists essentially of per 100 parts:

| Component | Parts by Weight |
|---|---|
| Volatilizable Metal Oxide | 9 to 80 |
| $SiO_2$ | 0 to 35 |
| $B_2O_3$ | 0 to 40 |
| $Na_2O$ | 0 to 40 |
| $K_2O$ | 0 to 25 |
| CaO | 0 to 30 |
| $Al_2O_3$ | 0 to 30 |
| BaO | 0 to 40 |
| ZnO | 0 to 25 |
| $F_2$ | 0 to 10 | the fluorine being present as the fluoride of at least one of the metals indicated.

8. The frit composition of claim 1 in which said volatilization metal oxide is an oxide of antimony.

9. The frit composition of claim 1 in which said primary frit composition is adapted to form a porous ceramic coat upon said firing and cooling.

10. The frit composition of claim 1 in which said primary frit composition is adapted to form a porous ceramic coat upon said firing and cooling and contains an oxidation catalyst.

11. The frit composition of claim 1 in which said primary frit composition is adapted to form a porous ceramic coat upon said firing and cooling and contains an oxidation catalyst in an amount to form about 10% to about 70% by weight of said ceramic coat, the oxidation catalyst being at least one metal oxide selected from a group consisting of the oxides of cobalt, manganese, copper, and chromium.

12. The frit composition of claim 1 in which said primary frit composition is adapted to form a porous ceramic coat upon said firing and cooling and contains an oxidation catalyst in an amount to form from about 15% to about 70% by weight of said ceramic coat, the oxidation catalyst consisting essentially of iron oxide.

13. In a process for forming a ceramic coat over a metal substrate containing iron by applying a frit composition thereover and firing, the improvement of inhibiting oxidation of said substrate during the firing by using combined frit compositions comprising (a) in a major amount a primary devitrifiable frit composition adapted to fuse at a firing temperature and upon cooling form devitrified particles, and (b) in minor amount a secondary frit composition adapted to form at a firing temperature a substantially amorphous glass, firing said primary and secondary frit compositions, forming an amorphous glass from said secondary composition, precipitating crystals of said volatilizable metal oxide from said amorphous glass, at least partially volatilizing said crystals to provide protective vapors effective to inhibit oxidation of said substrate, forming devitrified particles from said primary composition upon cooling, and using said amorphous glass to bond said devitrified particles one to another, said volatilizable metal oxide being selected from the oxides of antimony, tin, vanadium, molybdenum, lead, arsenic, and mixtures thereof, the combination of said devitrifiable primary and amorphous secondary frit compositions providing a balance, controlled release of the volatilizable metal oxide at the time of said firing to extend the protection afforded by the volatilizable metal oxide over a period of time.

14. The process of claim 13 in which said secondary frit composition contains about 14% to about 50% by weight of fluxing agents.

15. The process of claim 13 in which said secondary frit composition contains from about 30% to about 50% by weight of fluxing agents.

16. The process of claim 13 in which said firing is within the range of about 1300° F to about 1700° F.

17. The process of claim 13 in which said secondary frit composition consists essentially per 100 parts of:

| Component | Parts by Weight |
|---|---|
| Volatilizable Metal Oxide | 9 to 80 |
| $SiO_2$ | 0 to 35 |
| $B_2O_3$ | 0 to 40 |
| $Na_2O$ | 0 to 40 |
| $K_2O$ | 0 to 25 |
| CaO | 0 to 30 |
| $Al_2O_3$ | 0 to 30 |
| BaO | 0 to 40 |
| ZnO | 0 to 25 |
| $F_2$ | 0 to 10 |

18. The process of claim 13 in which said volatilizable metal oxide is an oxide of antimony.

19. The process of claim 13 in which said secondary frit composition comprises from about 10% to about 45% by weight of said primary frit composition.

20. The process of claim 13 in which firing and cooling said primary frit composition forms a porous ceramic coat, and at least one of said primary and secondary frit composition contains an oxidation catalyst.

21. The process of claim 13 in which firing and cooling said primary frit composition forms a porous ceramic coat and said primary frit composition contains an oxidation catalyst in an amount to form from about 10% to about 70% by weight of said ceramic coat, the oxidation catalyst being at least one metal oxide selected from the group consisting of the oxides of cobalt, manganese, copper and chromium.

22. The process of claim 13 in which firing and cooling said primary frit composition forms a porous ceramic coat, and said primary frit compositions contains an oxidation catalyst in an amount to form from about 15% to about 70% by weight of said ceramic coat, the oxidation catalyst consisting essentially of iron oxide.

23. The process of claim 13 in which said secondary frit composition contains from about 9% to about 80% by weight of said volatilizable metal oxide.

24. The process of claim 13 in which firing said primary frit composition forms a porous ceramic coat.

25. The process of claim 13 in which said firing is at least as high as 1480° F for at least three minutes.

* * * * *